(12) United States Patent
Kaltenbach et al.

(10) Patent No.: US 10,538,235 B2
(45) Date of Patent: Jan. 21, 2020

(54) METHOD FOR CHANGING A RANGE GROUP WITHOUT INTERRUPTING THE TRACTIVE FORCE

(71) Applicant: ZF Friedrichshafen AG, Friedrichshafen (DE)

(72) Inventors: Johannes Kaltenbach, Friedrichshafen (DE); Johannes Glückler, Eriskrich (DE); Stefan Renner, Bodman-Ludwigshafen (DE); Rayk Gersten, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 94 days.

(21) Appl. No.: 15/773,007

(22) PCT Filed: Oct. 14, 2016

(86) PCT No.: PCT/EP2016/074687
§ 371 (c)(1),
(2) Date: May 2, 2018

(87) PCT Pub. No.: WO2017/076606
PCT Pub. Date: May 11, 2015

(65) Prior Publication Data
US 2018/0319386 A1 Nov. 8, 2018

(30) Foreign Application Priority Data
Nov. 3, 2015 (DE) .................. 10 2015 221 493

(51) Int. Cl.
*B60W 20/15* (2016.01)
*B60K 6/365* (2007.10)
(Continued)

(52) U.S. Cl.
CPC ............. *B60W 20/15* (2016.01); *B60K 6/365* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS 6,575,866 B2 * 6/2003 Bowen .................. B60K 6/365
475/5
7,992,458 B2   8/2011 Krieger et al.
(Continued)

FOREIGN PATENT DOCUMENTS

DE   10 2005 043 703 A1   3/2007
DE   10 2009 046 620 A1   5/2011
(Continued)

OTHER PUBLICATIONS

German Search Report Corresponding to 10 2015 221 487.7 dated Sep. 22, 2016.
(Continued)

*Primary Examiner* — Dirk Wright
(74) *Attorney, Agent, or Firm* — Davis & Bujold PLLC; Michael J. Bujold

(57) ABSTRACT

A method for tractive force interruption-free shifting of a hybrid drive comprising combustion engine (21), electric engine (2), main gear (HG) comprising two parallel connected partial gears, output shaft (3), and first and second planetary gears (PG1, PG2). Each partial gear having either first hollow gear input shaft (4) or second solid gear input shaft (5). The first planetary gear (PG1) is connected to the main gear (HG) as the range group, with main gear (HG) comprising at least five gear planes (R1-R5) and at least four
(Continued)

shifting elements (S1-S4). The electric engine (2) is connected to carrier (ST1) of the range group (PG1) and the output shaft (3) so that the electric engine (2) supports tractive force while the range group (PG1) is shifted, and the fifth gear plane (R5) is connected to carrier (ST1) of range group (PG1) and thus can be shifted under load.

10 Claims, 8 Drawing Sheets

(51) Int. Cl.
  *B60K 6/48* (2007.10)
  *B60K 6/547* (2007.10)
  *F16H 37/04* (2006.01)
  *B60W 10/06* (2006.01)
  *B60W 10/08* (2006.01)
  *B60W 10/115* (2012.01)
  *B60W 30/19* (2012.01)
  *F16H 37/06* (2006.01)
  *F16H 3/00* (2006.01)

(52) U.S. Cl.
  CPC ............ *B60W 10/06* (2013.01); *B60W 10/08* (2013.01); *B60W 10/115* (2013.01); *B60W 30/19* (2013.01); *F16H 37/046* (2013.01); *F16H 37/065* (2013.01); *B60K 2006/4816* (2013.01); *B60W 2710/0644* (2013.01); *B60W 2710/0666* (2013.01); *B60W 2710/081* (2013.01); *B60W 2710/083* (2013.01); *B60W 2710/1005* (2013.01); *B60Y 2200/92* (2013.01); *F16H 2003/007* (2013.01); *F16H 2200/0069* (2013.01); *F16H 2200/2007* (2013.01); *Y02T 10/6221* (2013.01); *Y02T 10/6256* (2013.01)

(56) References Cited

U.S. PATENT DOCUMENTS

| | | | |
|---|---|---|---|
| 8,663,065 B2 | 3/2014 | Kaltenbach | |
| 8,684,875 B2 | 4/2014 | Kaltenbach et al. | |
| 8,911,315 B2 | 12/2014 | Kaltenbach et al. | |
| 8,961,345 B2* | 2/2015 | Kaltenbach | F16H 3/126 |
| | | | 475/5 |
| 9,180,872 B2 | 11/2015 | Lee et al. | |
| 9,403,428 B2 | 8/2016 | Glueckler | |
| 9,528,583 B2 | 12/2016 | Lübke et al. | |
| 9,541,180 B2 | 1/2017 | Kaltenbach | |
| 9,546,721 B2 | 1/2017 | Mittelberger et al. | |
| 10,071,622 B2* | 9/2018 | Kaltenbach | B60W 20/40 |
| 2012/0216639 A1 | 8/2012 | Renner | |
| 2012/0240723 A1 | 9/2012 | Gluckler et al. | |
| 2013/0096761 A1 | 4/2013 | Kuroda et al. | |
| 2014/0038762 A1 | 2/2014 | Wechs | |
| 2014/0150604 A1 | 6/2014 | Kaltenbach | |
| 2015/0184731 A1 | 7/2015 | Lee et al. | |
| 2015/0226324 A1 | 8/2015 | Gluckler et al. | |
| 2015/0267778 A1 | 9/2015 | Peterson et al. | |
| 2015/0375736 A1 | 12/2015 | Kaltenbach et al. | |
| 2018/0319264 A1* | 11/2018 | Kaltenbach | B60K 6/365 |
| 2018/0319265 A1* | 11/2018 | Kaltenbach | B60K 6/365 |
| 2018/0319266 A1* | 11/2018 | Kaltenbach | F16H 37/046 |
| 2018/0354520 A1* | 12/2018 | Kaltenbach | B60K 6/365 |
| 2019/0031016 A1* | 1/2019 | Gluckler | B60K 6/365 |
| 2019/0077246 A1* | 3/2019 | Preuss | B60K 6/365 |
| 2019/0176808 A1* | 6/2019 | Gersten | B60K 6/365 |

FOREIGN PATENT DOCUMENTS

| | | |
|---|---|---|
| DE | 10 2009 054 752 A1 | 6/2011 |
| DE | 10 2010 030 571 A1 | 12/2011 |
| DE | 10 2010 030 573 A1 | 12/2011 |
| DE | 10 2010 030 575 A1 | 12/2011 |
| DE | 10 2010 063 582 A1 | 6/2012 |
| DE | 10 2011 005 531 A1 | 9/2012 |
| DE | 10 2011 080 069 A1 | 1/2013 |
| DE | 10 2013 105 785 A1 | 12/2013 |
| DE | 10 2012 213 711 A1 | 2/2014 |
| DE | 10 2012 217 503 A1 | 3/2014 |
| DE | 10 2012 218 367 A1 | 4/2014 |
| DE | 10 2012 220 063 A1 | 5/2014 |
| DE | 10 2012 220 829 A1 | 5/2014 |
| DE | 10 2012 221 889 A1 | 6/2014 |
| DE | 10 2013 200 158 A1 | 7/2014 |
| DE | 10 2013 211 969 A1 | 1/2015 |
| DE | 10 2013 222 510 A1 | 5/2015 |
| DE | 10 2014 202 381 A1 | 8/2015 |
| EP | 2 457 760 A2 | 5/2012 |
| WO | 2012/084330 A1 | 6/2012 |
| WO | 2015/142265 A1 | 9/2015 |

OTHER PUBLICATIONS

German Search Report Corresponding to 10 2015 221 490.7 dated Sep. 23, 2016.
German Search Report Corresponding to 10 2015 221 499.0 dated Jul. 15, 2016.
German Search Report Corresponding to 10 2015 221 514.8 dated Sep. 29, 2016.
German Search Report Corresponding to 10 2015 221 493.1 dated Sep. 27, 2016.
International Search Report Corresponding to PCT/EP2016/074680 dated Jan. 26, 2017.
International Search Report Corresponding to PCT/EP2016/073763 dated Dec. 7, 2016.
International Search Report Corresponding to PCT/EP2016/074446 dated Dec. 13, 2016.
International Search Report Corresponding to PCT/EP2016/076417 dated Feb. 17, 2017.
International Search Report Corresponding to PCT/EP2016/074687 dated Jan. 2, 2017.
Written Opinion Corresponding to PCT/EP2016/074680 dated Jan. 26, 2017.
Written Opinion Corresponding to PCT/EP2016/073763 dated Dec. 7, 2016.
Written Opinion Corresponding to PCT/EP2016/074446 dated Dec. 13, 2016.
Written Opinion Corresponding to PCT/EP2016/076417 dated Feb. 17, 2017.
Written Opinion Corresponding to PCT/EP2016/074687 dated Jan. 2, 2017.

* cited by examiner

Fig. 2

| | PG2 | R1 | R2 | R3 | R4 | R5 | PG1 |
|---|---|---|---|---|---|---|---|
| i | -2 | -1.3 | -0.592 | -1 | -0.769 | -2.197 | -2.713 |

Fig. 3

| | S1 | | | S2 | | S3 | | S4 | | S5 | | S6 | | i | phi |
|---|---|---|---|---|---|---|---|---|---|---|---|---|---|---|---|
| | A | B | C | | D | E | F | G | H | L | S | I | J | | |
| G1 | x | | x | | | | | x | | x | | | x | 10.604 | 1.300 |
| G2(1) | x | x | | | x | | | x | | x | | | x | 8.157 | 1.000 |
| G2(4) | | x | | | x | | | x | | x | | | x | 8.157 | 1.300 |
| G3(4) | | x | x | | | x | | x | | x | | | x | 6.274 | 1.299 |
| G4 | | x | x | | | | | x | | x | | | x | 4.829 | 1.300 |
| G5(4) | | x | x | | | | | x | | x | | | x | 3.713 | 1.000 |
| G5(9) | | x | | | | | | | | x | | | x | 3.713 | 1.000 |
| G5(6) | | | | | | | | | | x | | | x | 3.713 | 1.300 |
| G6 | x | | | | | | x | x | x | | | | x | 2.856 | 1.300 |
| G7(6) | x | | | | | | x | | x | | | | x | 2.197 | 1.000 |
| G7(9) | x | | | | | | x | | x | | | | x | 2.197 | 1.300 |
| G8(9) | | x | | | | | | | x | | x | | x | 1.689 | 1.299 |
| G9 | | x | x | | | x | | | x | | x | | x | 1.301 | 1.301 |
| G10(9) | | | x | | | | x | | x | | x | | x | 1.000 | 1.000 |
| G10 | | | x | | | | x | | x | | x | | x | 1.000 | 1.000 |
| G10(6) | x | | | | | | x | | | | x | | x | 1.000 | 1.000 |
| G10(0) | x | | | | | | x | | | | x | | x | 1.000 | 1.000 |

Fig. 4

| | S1 | | S2 | | S3 | | S4 | | S5 | | S6 | | i | phi |
|---|---|---|---|---|---|---|---|---|---|---|---|---|---|---|
| | A | B | C | D | E | F | G | H | L | S | I | J | | |
| G1 | x | | x | | | | x | | x | | x | | 10.604 | 1.300 |
| G2(1) | x | | | | | | x | | x | | x | | 8.157 | 1.000 |
| G2(4) | | x | | x | | | x | | x | | x | | 8.157 | 1.300 |
| G3(4) | | x | | x | x | | x | | x | | x | | 6.274 | 1.299 |
| G4 | | x | x | | | | x | | x | | x | | 4.829 | 1.300 |
| G5(4) | | x | | | | | x | | x | | x | | 3.713 | 1.000 |
| G5(9) | | x | | | | x | | x | | | x | | 3.713 | 1.000 |
| G5(6) | | | | | | x | | x | | | x | | 3.713 | 1.300 |
| G6 | x | | x | | | | | x | | x | x | | 2.856 | 1.300 |
| G7(6) | x | | | x | | | | x | | x | x | | 2.197 | 1.000 |
| G7(9) | x | | | x | | | | x | | x | x | | 2.197 | 1.300 |
| G8(9) | | x | | | | | | x | | x | x | | 1.689 | 1.299 |
| G9 | | x | x | | | x | | x | | x | x | | 1.301 | 1.301 |
| G10(9) | | | x | | | x | | | | x | x | | 1.000 | 1.000 |
| G10 | | | x | | | x | | | | x | x | | 1.000 | 1.000 |
| G10(6) | x | | | | | x | | | | x | x | | 1.000 | 1.000 |
| G10(0) | x | | | | | x | | | | x | x | | 1.000 | 1.000 |

|  | S1 | | S2 | | S3 | | S4 | | S5 | | i | phi |
|---|---|---|---|---|---|---|---|---|---|---|---|---|
|  | A | B | C | D | E | F | G | H | L | S | | |
| G1 | x |  |  |  |  |  |  |  |  |  | 10.604 | 1.300 |
| G2(1) | x |  |  |  |  |  |  |  |  |  | 8.157 | 1.000 |
| G2(4) |  | x |  | x |  |  | x |  | x |  | 8.157 | 1.300 |
| G3(4) |  | x | x |  |  |  | x |  | x |  | 6.274 | 1.299 |
| G4 |  | x | x |  | x |  | x |  | x |  | 4.829 | 1.300 |
| G5(4) |  | x |  |  |  | x | x |  | x |  | 3.713 | 1.000 |
| G5(9) |  |  |  |  |  | x |  |  | x |  | 3.713 | 1.000 |
| G5(6) |  |  |  |  |  | x |  |  | x |  | 3.713 | 1.300 |
| G6 | x |  | x |  |  |  |  |  |  | x | 2.856 | 1.300 |
| G7(6) | x |  |  | x |  |  |  | x |  | x | 2.197 | 1.000 |
| G7(9) |  | x |  | x | x |  |  | x |  | x | 2.197 | 1.300 |
| G8(9) |  | x | x |  |  |  |  | x |  | x | 1.689 | 1.299 |
| G9 |  | x |  |  |  | x |  | x |  | x | 1.301 | 1.301 |
| G10(9) |  |  | x |  |  | x |  | x |  | x | 1.000 | 1.000 |
| G10 |  |  | x |  |  |  |  | x |  | x | 1.000 | 1.000 |
| G10(6) | x |  |  |  |  | x |  |  |  | x | 1.000 | 1.000 |
| G10(0) | x |  |  |  |  | x |  |  |  | x | 1.000 | 1.000 |

| | S1 | | S2 | | S3 | | S4 | | S5 | | S7 | i | phi |
|---|---|---|---|---|---|---|---|---|---|---|---|---|---|
| | A | B | C | D | E | F | G | H | L | S | R | | |
| G1 | x | | | | | | | | | | | 10.604 | 1.300 |
| G2(1) | x | x | | | | | | | | | | 8.157 | 1.000 |
| G2(4) | | x | | x | | | x | | x | | | 8.157 | 1.300 |
| G3(4) | | x | x | | x | | x | | x | | | 6.274 | 1.299 |
| G4 | | x | | x | | | x | | x | | | 4.829 | 1.300 |
| G5(4) | | x | | | | x | x | x | x | | | 3.713 | 1.000 |
| G5(9) | | | | | | x | x | x | x | x | | 3.713 | 1.000 |
| G5(6) | x | | | | | x | | x | x | x | | 3.713 | 1.300 |
| G6 | x | | | | | | | x | | x | | 2.856 | 1.300 |
| G7(6) | x | | x | | | | | x | | x | | 2.197 | 1.000 |
| G7(9) | | x | | x | | x | | x | | x | | 2.197 | 1.300 |
| G8(9) | | x | | x | | x | | x | | x | | 1.689 | 1.299 |
| G9 | | x | x | | | x | | | | x | | 1.301 | 1.301 |
| G10(9) | | x | x | | | x | | | | x | | 1.000 | 1.000 |
| G10 | | | | x | | x | | | | x | | 1.000 | 1.000 |
| G10(6) | x | | | | | | | | | x | | 1.000 | 1.000 |
| G10(0) | x | | | | | | | | | x | | 1.000 | 1.000 |
| G10(R) | | | | | | | | | | x | x | 1.000 | 10.604 |
| GR1 | x | | | | | | x | | x | | x | -21.231 | -2.002 |
| GR2 | | x | | | | | x | | x | | x | -9.662 | -0.911 |
| GR3 | x | | | | | | | x | | x | x | -5.711 | -0.539 |
| GR4 | | x | | | | | | x | | x | x | -2.601 | -0.245 |

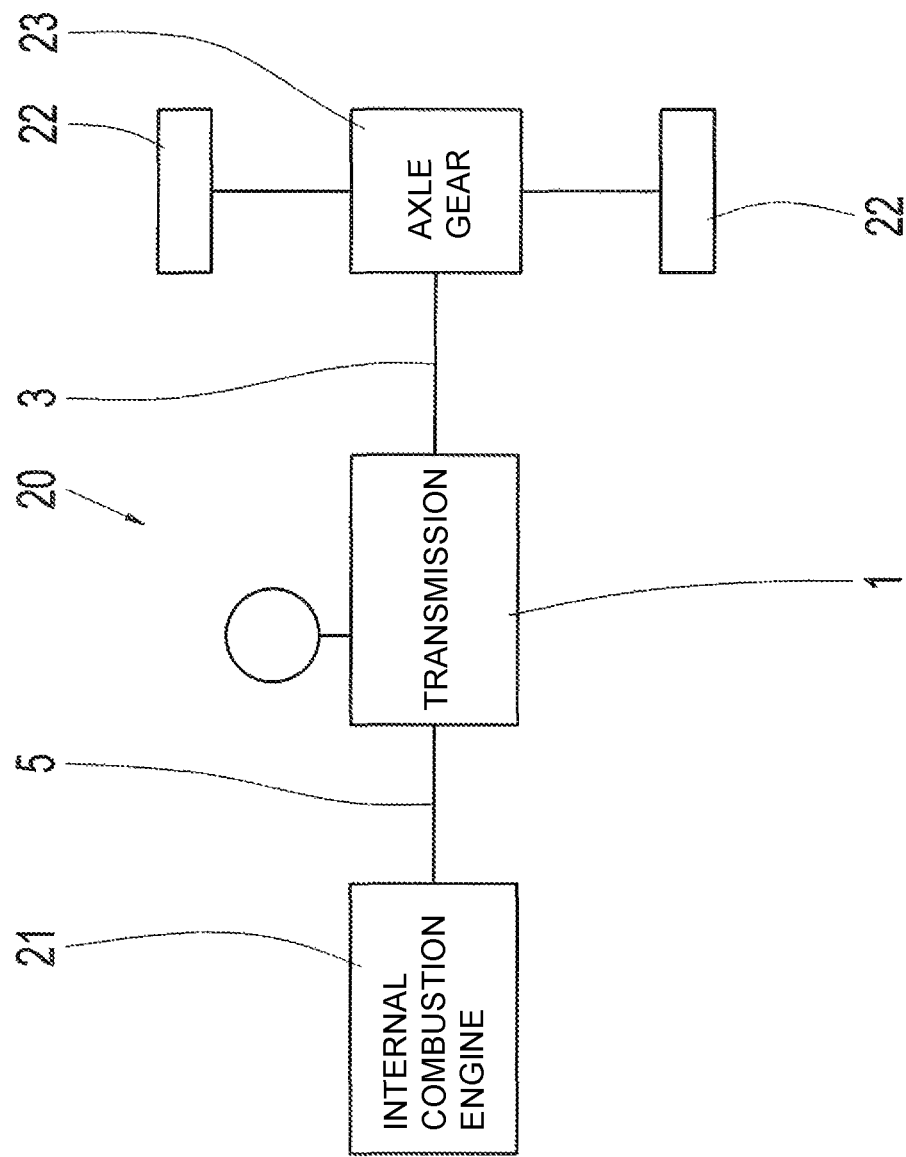

METHOD FOR CHANGING A RANGE GROUP WITHOUT INTERRUPTING THE TRACTIVE FORCE

This application is a National Stage completion of PCT/EP2016/074687 filed Oct. 14, 2016, which claims priority from German patent application serial no. 10 2015 221 493.1 filed Nov. 3, 2015.

FIELD OF THE INVENTION

The invention relates to a method for tractive force interruption-free shifting of a range group in a gear unit. A gear unit in this context refers in particular to a multi-gear gear unit, in which a plurality of gears, in other words, fixed transmission ratios between two shafts of the gear unit, can be shifted by means of shifting elements preferably in an automated manner. The shifting elements are for example clutches or brakes. Such gears are used especially in motor vehicles, in particular also in commercial vehicles, in order to suitably adapt the speed- and torque output characteristics of the drive unit to the driving resistance of the vehicle.

BACKGROUND OF THE INVENTION

Vehicles with hybrid drives are known from the prior art. Hybrid drives have two or more different drive sources, while drive trains with a combustion engine and one or more electric engines as parallel hybrids or as mixed hybrids have gained broad acceptance. These variants have a substantially parallel arrangement of the combustion engine and the electric drive, in the force flow, and thus permit both an overlaying of the driving torque and an activation with solely combustion engine drive or solely electric engine drive.

Document DE 10 2010 030 573 A1 made known a hybrid drive with an automatic shift gear unit, which comprises a combustion engine, which is drive-connected to at least a first gear input shaft, with an electric drive, which comprises at least an electric engine, which is drive-connected to a second gear input shaft, with at least one countershaft, with loose wheels and fixed wheels arranged in several gear set planes, with several gear shifting devices and with a gear output shaft. To permit great variability with regards to a gear set concept as well as the distribution and the number of electric and combustion engine gears, to keep construction expenses and costs low and to ensure efficient and comfortable operation, it is envisaged that the two gear input shafts are arranged coaxial to each other, and that a gear shifting device in one of its shifting positions connects the two gear input shafts to one another in a drive-effective manner, and in another shifting position shifts a gear. This permits a partial gear coupling which couples the two input shafts, the hollow shaft and the solid shaft, to one another without a gear being shifted.

To achieve maximally effective operation of the hybrid drive, drive strategies are used, which employ the electric drive in a flexible manner depending on the situation, for example for start-up, as a starter generator or as a generator for power generation. A device for a drive train of a hybrid vehicle is known from document DE 10 2010 063 582 A1, which device has a planetary gear comprising the elements carrier, sun gear and ring gear, wherein a first element of these elements of the planetary gear serves to firmly connect a first gear input shaft of a first partial gear of a gear unit, and wherein a second element of these elements of the planetary gear serves to firmly connect an electric engine of a hybrid drive, with a first shifting element, by means of which a third element of these elements of the planetary gear in a first shifting position of the first shifting element can be connected to a second gear input shaft of a second partial gear of the gear unit, to which a combustion engine of the hybrid drive can additionally be coupled, and, in a second shifting position of the first shifting element, can be connected at the housing side or stator side, and with a second shifting element, by means of which in the case of an engaged second shifting element, both gear input shafts of both partial gears can be coupled to one another and, in the case of a disengaged second shifting element, both gear input shafts of both partial gears can be separated from one another. This permits an electro-dynamic start-up and also electro-dynamic shifting. The electric engine can additionally be used as an integrated starter generator.

SUMMARY OF THE INVENTION

Based on the prior art, the person skilled in the art addresses the problem of providing a method for an automatic load-shiftable shift gear unit for hybrid applications, which can also be operated in a load-shiftable manner in the range change.

The problem is solved by means of the features of the independent claims. Advantageous embodiments will emerge from the dependent claims, the description and the figures.

A corresponding gear unit has a main gear comprising two parallel connected partial gears with at least one countershaft, and an output shaft and two planetary gears having at least the elements carrier, sun gear and ring gear. Each partial gear has a gear input shaft, with a first gear input shaft for a first partial gear being designed as a hollow shaft and a second gear input shaft for a second partial gear being designed as a solid shaft. A first planetary gear is connected as a range group to the main gear. A range group serves to double the gear number of the main gear, with two ranges being able to be shifted, a fast range and a slow range. For this purpose the gear unit comprises a fifth shifting element, which couples the ring gear of the range group either with an output shaft or locks it, in a housing-fixed manner. In the first shifting position, in which the ring gear is connected to the housing, a slow transmission is produced and in a second shifting position, in which the ring gear is coupled with the output shaft and is thus locked with the planetary gear, a fast transmission is produced. The main gear comprises first, second, third, fourth and fifth gear planes and first, second, third and fourth shifting elements. A second planetary gear is provided between an electric engine and the first gear input shaft as a planetary stage.

The fifth gear plane forms the output constant of the main gear and can, with the aid of the fourth shifting element, be coupled in one of its shifting positions to the carrier of the range group. By means of the countershaft the electric engine can thus support the tractive force, in that the torque is transmitted directly from the countershaft, via the output constant, to the carrier of the range group and thus to the output shaft connected to the carrier of the range group, while the fifth shifting element becomes load free and can be shifted. This range change preferably takes place in the change from the fifth gear to the sixth gear, with firstly the shifting element for coupling the output constant and the carrier of the range group being changed and, thereafter, the shifting element being changed for connection of a gear plane of the first partial gear to the first gear input shaft.

Another advantage of this set-up is that when driving in the direct gear the speed of the countershaft can be reduced, in order to reduce drag losses for example at the bearings and the seals.

The fourth shifting element connects, in a first shifting position the fifth gear plane of the main gear, the output constant to the main shaft. Thus the countershaft is connected via the output constant of the main gear to the main shaft and the sun of the planetary gear of the range group.

The gear unit can comprise a sixth double-action shifting element, which, in a first shifting position, couples the second input shaft to the ring gear of the planetary stage and, in a second shifting position, locks in a housing-fixed manner the ring gear of the planetary stage. When the ring gear is coupled to the planetary stage, the planetary stage can act as a superimposition gear. A drive of the second input shaft is connected to the ring gear of the planetary gear, the electric engine is connected to the sun of the planetary gear stage and the carrier of the planetary gear stage is connected to the first input shaft of the main gear. In the second shifting position of the sixth shifting element, the planetary stage acts as a fixed pre-transmission for the electric engine. The electric engine can thus be designed in a cost-efficient manner with less torque but with a higher speed.

The ring gear of the planetary stage can, however, also be directly connected to the gear housing, or a part of the housing. This likewise produces a fixed pre-transmission of the electric engine with the above-mentioned advantages.

In addition, an arrangement is also possible in which the planetary stage of the gear is connected in such a way that the ring gear of the planetary stage is connected to the first gear input shaft, the carrier of the planetary stage is locked, in a housing-fixed manner, and the sun gear of the planetary stage is connected to the electric engine. The gear unit comprises a sixth simply functioning shifting element which, when activated, connects the second gear input shaft to the electric engine and the sun gear of the planetary stage. The electric drive thus rotates backward in the forward gears and, via the planetary stage with the aid of the sixth shifting element, mechanical reverse gears are provided for driving the second gear input shaft. Those gears which are assigned to the first partial gear or to the first gear input shaft are then used as reverse gears with additional reduction via the planetary gear.

The main gear comprises at least one countershaft. It can however also be designed as a power divided dual countershaft gear. All toothed wheels on the countershaft are designed as fixed wheels. In the embodiment variant with two countershafts, both countershafts are designed with one fixed wheel per gear plane of the main gear.

The main gear is designed as a 5-gear gear set, with five gear planes, with two partial gears and a partial gear coupling. The fifth gear plane forms the output constant. All gear planes are formed as forward gear planes and a reverse gear is generated via a rotation direction reversal of the electric engine.

The first partial gear is assigned to the first gear input shaft, which is designed as a hollow shaft. The second partial gear is assigned to the second gear input shaft, which is designed as a solid shaft. A direct gear is also assigned to the second partial gear, in which the force flow is not conveyed via the countershaft or countershafts. The two partial gears can be coupled by one of the shifting elements so that, to some extent, the gears of the partial gear can be used by the respective other partial gear. This also permits a coupling of the two drives, without a torque being conveyed to the output shaft. Thanks to the two partial gears, it is also possible for the two drives to be operated with different transmissions. It is thus possible to select for both drives operating points which are driving situation-appropriate. The electric engine can, however, also be partially or fully at a standstill in order to avoid zero load losses.

All shifting elements in the main gear are designed as unsynchronized claw shifting elements.

All shifting elements of the main gear and of the first planetary gear, the range group, are designed as double-action shifting elements, which means that they have two activation directions in a first and in a second shifting position. They can, however, also be brought into a third opened shifting position, a neutral position, in which neither the first nor the second shifting position is activated and no components are connected by means of the shifting element.

The coupling of components of the gear unit to the housing can also be realized by means of the coupling to a housing-fixed component or a housing part or to another torque-resistant constructive element of the gear unit.

The gear unit can be a component of a drive train of a hybrid vehicle. The drive train has, in addition to the gear unit, a combustion engine as a second drive, as well as an axle gear connected to wheels of the hybrid vehicle, with the second gear input shaft of the main gear being permanently connected or connectable to the combustion engine and with the output shaft of the gear unit being drive-effectively connected to the axle gear. A separating clutch for the combustion engine can be used, but is however not necessary for purely electric driving because the second gear input shaft can be uncoupled by means of opening of shifting elements.

BRIEF DESCRIPTION OF THE DRAWINGS

The present invention is explained in further detail below with reference to exemplary embodiments:

FIG. 2: a table with exemplary transmissions of the gear unit of FIG. 1,

FIG. 3: a shifting matrix for the method according to the invention,

FIG. 4: a shifting matrix for the method according to the invention,

FIG. 6: a shifting matrix for the method according to the invention for embodiment variant 2, FIG. 8: a shifting matrix for the method according to the invention for embodiment variant 3, FIG. 9: a drive train.

DETAILED DESCRIPTION OF THE PREFERRED EMBODIMENTS

Figure 1:
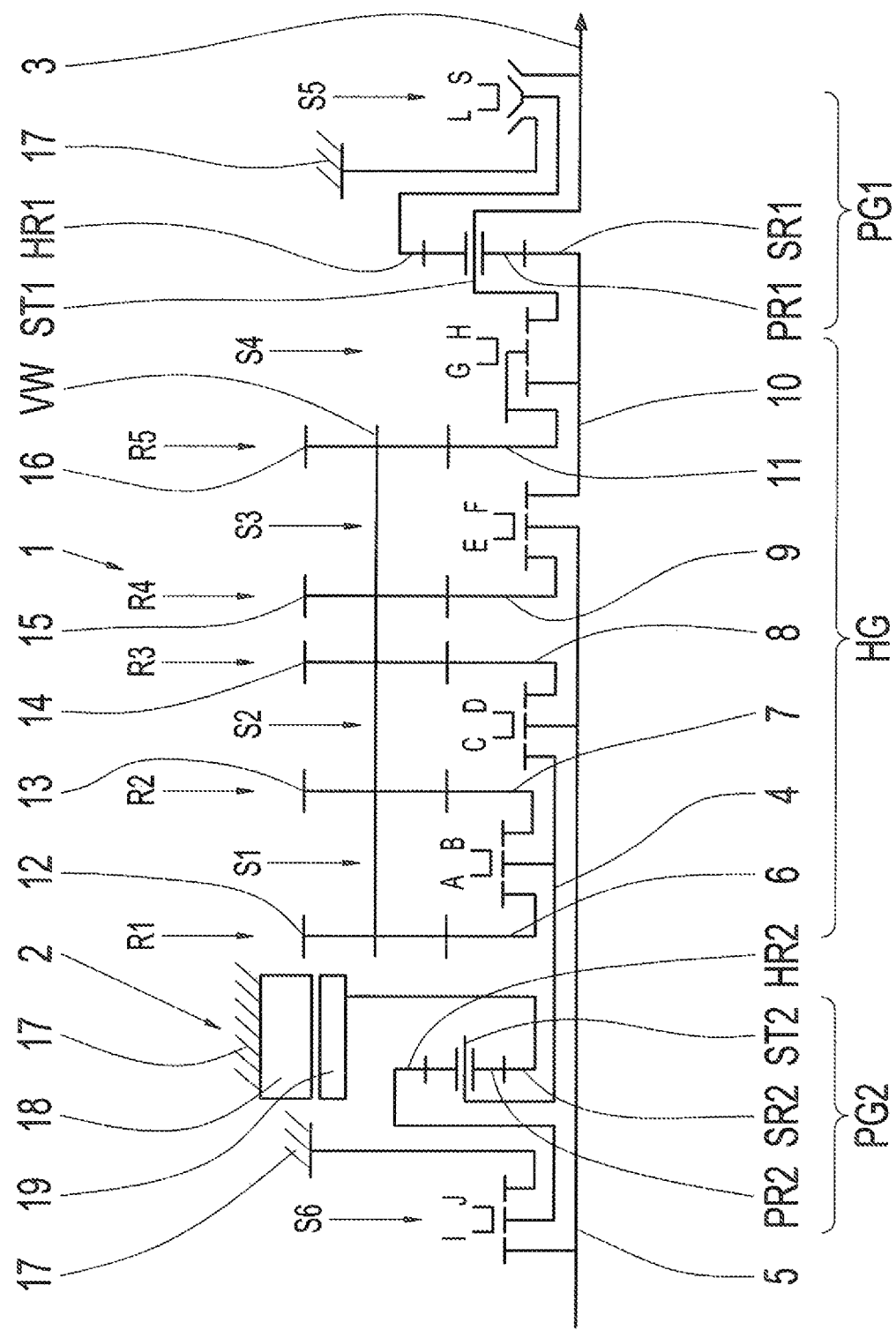
FIG. 1: a 10-gear gear unit for the method according to the invention.

FIG. 1 shows a first embodiment of a gear unit 1 with an electric engine 2, with a 5-gear main gear HG with two partial gears, with an output shaft 3, a first planetary gear PG1 and a second planetary gear PG2, which each comprise the elements carrier ST1, ST2, at least one planetary gear PR1, PR2, sun gear SR1, SR2 and ring gear HR1, HR2. The first planetary gear PG1 is used as a range group and is connected to the main group HG. The second planetary gear PG2 is arranged as a planetary stage between the electric engine 2 and the first gear input shaft 4. The first gear input shaft 4 is designed as a hollow shaft and is assigned to a first partial gear of the main gear HG. A second gear input shaft 5 is designed as a solid shaft and is assigned to the second partial gear of the main gear HG. The main gear HG comprises a first gear plane R1, a second gear plane R2, a third gear plane R3, a fourth gear plane R4 and a fifth gear plane R5 and a first shifting element S1, a second shifting element S2, a third shifting element S3 and a fourth shifting element 34. The fifth gear plane R5 forms the output constant of the main gear HG. All shifting elements of the main gear S1-S4 are formed as double-action two-sided shifting elements and can connect two different elements of the gear unit 1 to a shaft or a gear component. The first gear plane R1 is formed by a first loose wheel 6 of the first gear input shaft 4 with a first fixed wheel 12 of the countershaft W. The second gear plane R2 is formed by a loose wheel 7 of the first gear input shaft 4 with a second fixed wheel 13 of the countershaft VW. The first gear plane R1 and the second gear plane R2 can also be interchanged. The third gear plane R3 is formed by a third loose wheel 8 on the second gear input shaft 5 and a third fixed wheel 14 of the countershaft VW. The fourth gear plane R4 is formed by a fourth loose wheel 9 on the second gear input shaft 5 and a fourth fixed wheel 15 on the countershaft VW. The fifth gear plane R5 is formed by a fifth loose wheel 11 on the main shaft 10 and a fifth fixed wheel 16 on the countershaft VW. The main shaft 10 extends coaxial to the gear input shafts 4, 5 and the output shaft 3 and lies between the second gear input shaft 5 and the output shaft 3. The countershaft VW extends parallel to the axis of the gear input shafts 4, 5, the main shaft 10 and the output shaft 3. The first shifting element S1 can, in a first shifting position A, connect the first gear plane R1 or, in a second shifting position B, connect the second gear plane R2 to the first gear input shaft 4. The second shifting element S2 can, in a first shifting position C, connect the first gear input shaft 4 or, in a second shifting position D, connect the third gear plane R3 to the second gear input shaft 5. The second shifting element S2 in the first shifting position C thus serves the partial gear coupling. The third shifting element S3 can, in a first shifting position E, couple the fourth gear plane R4 or, in a second shifting position F, couple the main shaft 10 to the second gear input shaft 5. In the second shifting position F, a direct gear can thus be shifted, wherein torque from the second gear input shaft 5 is transmitted, via the main shaft 10 and the first planetary gear PG1, to the output shaft 3. The fourth shifting element S4 can, in a first shifting position G, connect the main shaft 10, or in a second shifting position H, connect the carrier ST1 of the first planetary gear PG1 to the fifth gear plane R5. The output constant, the fifth gear plane R5 of the main gear HG, can thus be coupled via a single shifting element, the fourth shifting element S4, either to the sun SR1 or to the carrier ST1 of the first planetary gear PG1, because the main shaft 10 is directly connected to the sun SR1 of the first planetary gear. Thanks to the thus possible coupling of the electric engine 2, via the output constant to the carrier ST1 of the first planetary gear PG1, the fifth shifting element S5 becomes load free and can be shifted. The electric engine 2 thus supports the tractive force via the countershaft VW, so that the range group PG1 can be shifted in a tractive force-supported manner. An additional advantage of the coupling of the electric engine 2 to the carrier ST1 is that the speed of the countershaft VW, during driving in the direct gear, can be decreased in order to reduce drag losses at the bearings and seals. Each of the shifting elements S1-S4 can also be shifted in neutral, so that it connects none of said elements to one another.

The gear unit 1 comprises a range group in the form of a first planetary gear PG1. The range group PG1 serves to double the gear numbers of the main gear HG. For this purpose, by means of a fifth shifting element S5, which is assigned to the range group PG1, the ring gear HR1 of the first planetary gear PG1, in a first shifting position L, can be connected to a housing-fixed component 17 or a housing part or to another torque-resistant component of the gear unit 1. A slow range is thus formed. In a second shifting position S of the fifth shifting element S5, the ring gear HR1 of the first planetary gear PG1 can be connected to the output shaft 3 and thus also to the carrier ST1 of the first planetary gear PG1. The carrier ST1 is connected, in a torque-resistant manner, to the output shaft 3. Thus the components carrier ST1 and ring gear HR1, in the second shifting position S of the shifting element S5, are locked with one another and form a fast range.

The second planetary gear PG2 is arranged as a planetary stage between an electric engine 2 and the first gear input shaft 4. The electric engine 2 has a stator 18, which is connected, in a torque-resistant manner, to a housing-fixed component 17 or a gear housing of the gear unit 1 or to another torque-resistant constructive element of the gear unit 1, so that the stator 18 cannot take on any speed. A rotatably mounted rotor 19 of the electric engine 2 is connected, in a torque-resistant manner, to a planetary gear set shaft of the planetary stage PG2 formed as a sun gear SR2 of the second planetary gear PG2. The carrier ST2 of the second planetary gear PG2 is connected, in a torque-resistant manner, to the first gear input shaft 4. The ring gear HR2 of the second planetary gear PG2 can be connected, via a first shifting position I of a sixth shifting element S6 which is assigned to the second planetary gear PG2, to the second gear input shaft 5, and can be locked, in a housing-fixed manner, in a second shifting position J of the sixth shifting element S6. In the first shifting position I of the sixth shifting element S6, the planetary stage PG2 can act as a superimposition gear. In the second shifting position J of the sixth shifting element S6, the planetary stage PG2 acts as a fixed pre-transmission for the electric engine 2. The electric engine 2 can thus be designed in a cost-efficient manner with less torque but with a higher speed.

Thanks to the arrangement of the electric engine 2 with the planetary stage PG2 on the first gear input shaft 4, the electric engine 2 is assigned to the first partial gear. The second gear input shaft 5 is also driven by a second drive which is not depicted here. Because this is usually a combustion engine 21, the remainder of the document refers to a combustion engine 21 as the second drive. The combustion engine 21 is thus connected or connectable to the second partial gear. Each partial gear is also assigned shiftable gears via the assigned gear planes R1-R5. The first gear plane R1 and the second gear plane R2, of the main gear HG, are assigned to the first gear input shaft 4 and thus also to the first partial gear of the main gear HG. This permits a purely electric driving via the two gears, which are formed via the two gear planes R1 and R2. Thanks to the range group PG1, four shiftable purely electric gears are created. The reverse driving is possible by means of a rotation direction reversal of the electric engine 2. A separating clutch for the combustion engine 21 is not necessary for purely electric driving because the second gear input shaft 5 can be uncoupled by means of disengaging of the second and third shifting elements S2, S3. The third gear plane R3 and the fourth gear plane R4 of the main gear HG are assigned to the second gear input shaft 5 and thus also to the second partial gear of the main housing HG. The fifth gear plane R5 serves as an output constant for both partial gears of the main gear HG. Thanks to the partial gear coupling via the second shifting element S2 in the first shifting position C, the combustion engine 21 and the electric engine 2 can nevertheless use the gears of the respective other partial gear. Because the second shifting element S2 is designed as a double shifting element, a double-action two-sided shifting element, however, the electric engine 2 cannot use the third gear plane R3 of the main gear HG.

Thanks to the two partial gears, the combustion engine 21 and electric engine 2 can be operated with different transmissions. It is thus possible to select operating points, for the combustion engine 21 and for the electric engine 2, which are suitable depending on the respective driving situation. The electric engine 2 can, to some extent, also be entirely uncoupled and be at a standstill and thus avoid zero-load losses. An uncoupling of the electric engine 2 is possible, via the first and the second shifting elements S1 and S2, which must not connect the first gear input shaft 4 to another component, and the sixth shifting element S6, which must not couple the ring gear HR2 of the planetary stage to the second gear input shaft 5.

By means of the partial gear coupling, via the second shifting element S2 in the shifting position C, the combustion engine 21 can be connected to the electric engine 2, without torque being conveyed to the output shaft 3. At least the first shifting element S1 and the third shifting element S3 of the main gear HG are not activated, but are instead in a neutral position. The combustion engine 21 can thus be started with the electric engine 2 or power can be generated in neutral, i.e., independently of the driving speed, in other words also at a standstill. The combustion engine 21 thereby drives the electric engine 2. The electric engine 2 functions in the manner of a generator.

FIG. 1 shows only the top half of the gear set of the gear unit 1 which is symmetrical to the axis of the gear input shafts 4, 5, of the main shaft 10 and of the output shaft 3. The mirroring, along this axis, leads to a variant with two countershafts VW, which serve to divide the power. The gear set is, however, functionally identical in the embodiment variant with only one countershaft VW. This means that the countershaft VW including the associated fixed wheels 12, 13, 14, 15, 16 are not mirrored.

With the embodiment of FIG. 1, a start-up function known as EDSU, Electro-Dynamic Start-Up, can be realized. The electric engine 2 can be used exclusively or only to support the combustion engine 21 for start-up and acceleration. In the case of a purely electric start-up, increased start-up torque can be provided via the planetary gear PG2 acting as a constant transmission. To allow electro-dynamic start-up, the sixth shifting element S6 must be in its first shifting position I. When the sixth shifting element S6 is in the first shifting position I, the gear unit 1 is in the EDSU mode. A gear of the first partial gear, which is assigned to the first gear input shaft 4, must then be engaged and the second partial gear must be shifted to neutral, without transmission of torque. The first gear G1 of the gear unit 1 is assigned, in FIG. 1, to the first gear plane R1. The first gear plane R1 is assigned to the first partial gear. Thus for electro-dynamic start-up, the first shifting element S1 can be used in its first shifting position A and, in the further force flow for the first gear G1, the fourth shifting element S4 can be in its first shifting position G and the fifth shifting element S5 in its first shifting position L. Thus in the first gear G1, a force flow is prepared from the first gear input shaft 4 via the first gear plane R1, the countershaft VW, the output constant R5, the main shaft 10 and the range group PG1 in the slow range.

In the case of vehicle standstill, the combustion engine 21 rotates with the idling speed, for example, and the electric engine 2 rotates backward so that the carrier ST2 of the planetary stage PG2 is at a standstill. The torque ratios at the planetary stage PG2 are constant. The torque of the combustion engine 21 and the torque of the electric engine 2 are added together at the carrier ST2 of the planetary stage PG2. During the electro-dynamic start-up, the speed of the electric engine 2 changes up to the lock circulation at the planetary stage PG2. The start-up can be ended in that the second shifting element S2 is moved into its first shifting position C, and the planetary stage PG2 is thus locked.

If the gear unit 1 is operated in the EDSU mode, an electro-dynamic shifting (EDS) is possible as a load-shifting function. In the EDSU mode the sixth shifting element S6 remains in its first shifting position I. A gear assigned to the first partial gear and thus to the first gear input shaft 4 must be engaged. This serves as a support gear, by means of which the force flow is conveyed during the load shifting. The support gear can be identical to the actual gear or a target gear. However an additional gear of the first partial gear can also be used. The shifting process begins with a load takeover phase. At the combustion engine 21 and at the electric engine 2 the torques are set such that it corresponds to the stationary gear transmission of the planetary gear stage PG2. There is thus just one force flow via the carrier ST2 of the planetary gear stage PG2 and the support gear. All other shifting elements become load free. The shifting elements of the actual gear which have become load free are uncoupled. The speed of the combustion engine 21 and of the electric engine 2 are controlled such that the shifting element to be engaged of the target gear becomes synchronous. If synchronicity is attained, the shifting element of the target gear is engaged. The shifting operation is thus completed and the load on the electric engine 2 can be reduced, if necessary. The EDS shifting process has the advantage that the shifting element to be shifted to the target gear is synchronized through the interaction of the electric engine 2 and the combustion engine 21, with the electric engine 2 being very easily controlled. Another advantage of the EDS shifting process is that a high tractive force can be achieved because the torques of the combustion engine 21 and the electric engine 2 are added together at the second planetary gear PG2.

With the embodiment of FIG. 1, it is also possible to realize a function known as ISG, Integrated Starter Generator, in which the combustion engine 21 can be started and accelerated via the electric engine 2 and the electric engine 2 can also be used as a generator. In the ISG mode, the sixth shifting element S6 is in its second shifting position J and connects the ring gear HR2 to a housing-fixed component 17. Purely electric driving is also possible in the ISG mode, wherein the ring gear HR2 of the planetary gear stage PG2 is locked, in a housing-fixed manner, and the electric engine 2 transfers a torque to the carrier ST2 of the planetary gear stage PG2.

FIG. 2 specifies exemplary numerical values for the individual transmissions i of the respective gear planes PG1, PG2, R1-R5. The specified transmission corresponds to the respective tooth ratio of the spur gears or, in the case of planetary gears, the standard transmission $i_0$, the tooth ratio between the ring gear HR1, HR2 and the sun gear SR1, SR2. The negative symbol indicates a rotation direction reversal. The transmission i of the spur gear pairs is indicated in the following force flow direction:

First, second, third and fourth gear planes R1, R2, R3, R4: from the two gear input shafts 4, 5 to the countershaft VW Fifth gear plane R5: from the countershaft VW to the main shaft 10

Other numerical values may however also be used for the transmission range.

FIG. 3 shows a corresponding shifting matrix of the gear unit 1 for the ten gears G1-G10 from the perspective of the combustion engine 21 in the ISG mode. The sixth shifting element S6 remains in its second shifting position J. The gears G1-G10 are listed in the first column. When the combustion engine 21 conveys a force flow via the second partial gear, via the solid shaft 5, in the force flow-free first partial gear by means of the hollow shaft 4, a gear can be preselected or the partial gears can be coupled. The preselection gear is specified in brackets after the gear number. For example, in the case of the gear G2(1), the second gear G2 is active for the combustion engine 21, the first gear G1 is preselected for the combustion engine 21 and is, at the same time, already active for the electric engine 2. The columns next to the gears G1-G10 indicate which shifting elements S1-S5 are located in which shifting positions A-J. A cross x indicates an engaged shifting position A-J. Next to the columns of the shifting elements S1-S5 there is a column with exemplary gear transmissions i and a column with exemplary gear steps phi for each gear G1-G10.

The power flow in the first gear G1 is, as depicted in FIG. 3, conveyed to the output shaft 3 via the second gear input shaft 5, the second shifting element S2 in its first shifting position C, the first shifting element S1 in its first shifting position A, the first gear plane R1, the countershaft VW, the output constant R5, the fourth shifting element S4 in its first shifting position G, and the range group PG1 shifted in the slow range. The power flow in the second gear G2 is conveyed to the output shaft 3 via the second gear input shaft 5, the second shifting element S2 in its second shifting position D, the third gear plane R3, the countershaft VW, the output constant R5, the fourth shifting element S4 in its first shifting position G, and the range group PG1 shifted in the slow range. It is possible to preselect, via the first shifting element S1 in its first shifting position A, both the first gear G1 and thus the first gear plane R1 and also, via the second shifting position B, the fourth gear G4 and thus the second gear plane R2. The preselected gears G1, G4 are assigned to the first partial gear. The power flow in the third gear G3 is conveyed to the output shaft 3, via the second gear input shaft 5, the third shifting element S3 in its first shifting position E, the fourth gear plane R4, the countershaft VW, the output constant R5 the fourth shifting element S4 in its first shifting position G, and the range group PG1 shifted in the slow range, Via the first shifting element S1, in its second shifting position B, the fourth gear G4 and thus the second gear plane R2 can be preselected. The power flow in the fourth gear G4 is conveyed to the output shaft 3, via the second gear input shaft 5, the second shifting element S2 in its first shifting position C, the first gear input shaft 4, the first shifting element S1 in its second shifting position B, the second gear plane R2, the countershaft VW, the output constant R5, the fourth shifting element S4 in its first shifting position G, and the range group PG1 shifted in the slow range.

The power flow in the fifth gear G5 is conveyed to the output shaft 3 via the second gear input shaft 5, the third shifting element S3 in its second shifting position F, and the range group PG1 shifted in the slow range. The fourth gear G4 can be preselected via the first shifting element S1, in its second shifting position B, and via the fourth shifting element S4 in its first shifting position G. Alternatively, the ninth gear G9 can be preselected via the first shifting element S1, in its second shifting position B, and via the fourth shifting element S4, in its second shifting position H. It is likewise possible to preselect the sixth gear G6 via the first shifting element S1, in its first shifting position A, and via the fourth shifting element S4, in its second shifting position H. The power flow in the sixth gear G6 is conveyed to the output shaft 3, via the second gear input shaft 5, the second shifting element S2 in its first shifting position C, the first gear input shaft 4, the first shifting element S1 in its first shifting position A, the first gear plane R1, the countershaft VW, the output constant R5, the fourth shifting element S4, in its second shifting position H, and via the range group PG1 shifted to the fast range. According to the invention, the fifth shifting element S5 is load-free, because it is bypassed, due to the force transfer via the carrier ST1 of the range group PG1, by means of the fourth shifting element S4 in its second shifting position H.

The power flow in the seventh gear G7 is conveyed to the output shaft 3, via the second gear input shaft 5, the second shifting element S2 in its second shifting position D, the third gear plane R3, the countershaft VW, the output constant R5, the fourth shifting element S4, in its second shifting position H, and via the range group PG1 shifted to the fast range, with the fifth shifting element S5 remaining load-free. Via the first shifting element S1, in its first shifting position A, the sixth gear G6 can be preselected or via the first shifting element S1, in its second shifting position B, the ninth gear G9 can be preselected. The power flow in the eighth gear G8 is conveyed to the output shaft 3, via the second gear input shaft 5, the third shifting element S3 in its first shifting position E, the fourth gear plane R4, the countershaft VW, the output constant R5, the fourth shifting element S4 in its second shifting position H, and via the range group PG1 shifted to the fast range, with the fifth alternative shifting element S5 remaining load-free. It is possible to preselect the ninth gear G9 via the first shifting element S1, in its second shifting position B. The power flow in the ninth gear G9 is conveyed to the output shaft 3, via the second gear input shaft 5, the second shifting element S2 in its first shifting position C, the first gear input shaft 4, the first shifting element S1 in its second shifting position B, the second gear plane R2, the countershaft VW, the output constant R5, the fourth shifting element S4 in its second shifting position H and via the range group PG1 shifted to the fast range, with the fifth shifting element S5 remaining load-free. The power flow in the tenth gear G10 is conveyed to the output shaft 3, via the second gear input shaft 5, the third shifting element S3 in its second shifting position F, the main shaft 10 and via the range group PG1 shifted to the fast range. It is advantageous when the second shifting element S2, in its first shifting position C, is additionally shifted, because the first gear input shaft 4 is thus guided with a defined speed, here the speed of the second gear input shaft 5. Alternatively, the ninth gear G9 can be preselected via the first shifting element S1, in its second shifting position B, and the fourth shifting element S4, in its second shifting position H, with the fifth shifting element S5 being load-free. It is, however, also possible to preselect the sixth gear G6 via the first shifting element S1, in its first shifting position A, and the second shifting element S2, in its first shifting position C. This permits a decrease in the countershaft speed, while the fourth shifting element S4 must however be disengaged. The preselection of the first shifting element S1, in its first shifting position A, also permits a standstill of the electric engine 2 and the countershaft VW in the tenth gear, while the second shifting element S2 must be disengaged.

In the sixth, seventh, eighth and ninth gears G6-G9, the fifth shifting element S5 could also remain engaged in the first shifting position L instead of in the second shifting position 5, because the fifth shifting element S5 is load-free in both shifting positions L and S when the force flow is conveyed via the fourth shifting element S4, in the second shifting position H, directly to the carrier ST1 of the first planetary gear PG1. Due to the speed ratios at the range group PG1, it is however advantageous to complete, as early as possible, the change from the first shifting position L of the fifth shifting element S5 to the second shifting position S.

The tractive force interruption-free shift of the range group PG1 usually takes place during the change from the fifth gear G5 to the sixth gear G6. In the fifth gear G5, in the case of combustion engine driving or hybrid driving in the ISG mode, it is shifted via a direct gear in the slow range group PG1. The third shifting element S3 is in its second shifting position F and the fifth shifting element is in its first shifting position L. This can also be seen in FIG. 3 in the line G5(4). The electric engine 2 still functions in fourth gear G4 due to the previous history, with the first shifting element S1 being in its second shifting position B and the fourth shifting element S4 being in its first shifting position G. Now in order to shift to the sixth gear G6 in a tractive force interruption-free manner, the following method steps are realized:

When there is load on the electric engine 2, a load reduction takes place here. The combustion engine 21 takes on the load.

The fourth shifting element S4 can then be disengaged from the shifting position G.

The second shifting position H of the fourth shifting element S4 is actively synchronized via the speed control of the electric engine 2. For this purpose, the speed of the electric engine 2 must be reduced. The speed reduction takes place by the factor of the transmission of the range group PG1, which in the numerical example of FIG. 3 corresponds to the factor 3.713.

The fourth shifting element S4 can then be shifted in a load-free manner to the second shifting position H. This corresponds to the line of gear 5 (9) in the shifting matrix FIG. 3. In this state, the ninth gear G9 is preselected in a transitional manner, because the first shifting element S1 is still in its second shifting position B. This can now be disengaged in a load-free manner. The first shifting position A of the first shifting element S1 is now actively synchronized via speed control of the electric engine 2. For this purpose, the speed of the electric engine 2 must be increased to the target speed level of the sixth gear G6. The speed increase takes place by the ratio of the gear transmission of both gears which are assigned to the first gear input shaft, Here these are the first and the fourth gear G1, G4, which means a speed increase by the factor 1.3/0.592=2.2 (see FIG. 2, first and second gear planes R1, R2).

The first shifting element S1 can thus be brought to the shifting position A in a load-free manner, with the connection gear, the sixth gear G6, being simultaneously preselected.

A load transfer then takes place from the combustion engine 21 to the electric engine 2. This means that only the electric engine 2 supports the tractive force in the target gear, the sixth gear G6.

Once the combustion engine 21 is load-free, the second shifting position F of the third shifting element S3 is disengaged.

A change of the fifth shifting element S5 can now optionally take place from the first shifting position L to its second shifting position S while the shifting position F, of the third shifting element S3, is disengaged. This has the advantage that only the main shaft 10, and thus a low inertia mass, act on the sun gear SR1 of the first planetary gear PG1. The synchronization takes place via the shifting element S5 itself, which has a synchronized design. The second shifting position S of the fifth shifting element S5 can then be engaged. The second shifting position S cannot be actively synchronized with the combustion engine 21, because the combustion engine 21 cannot sufficiently reduce the speed, as here the speed level of the tenth gear G10 (the third shifting element S3 and the fifth shifting element S5, respectively, in the second shifting position F and S) would be required, although the sixth gear G6 is the target gear. The change from the first shifting position L to the second shifting position S of the fifth shifting element S5 is at this point, as already mentioned, advantageous but not absolutely necessary. The change could also take place, at a later point in time, outside of the shifting from the fifth gear G5 to the sixth gear G6. The fifth shifting element S5 would then remain, for the time being, in the first shifting position L.

Immediately after the shifting position F of the third shifting element S3 is disengaged, which may mean simultaneously with the just mentioned step, the combustion engine 21 synchronizes to the target speed of the sixth gear G6. Thus the first shifting position C of the second shifting element is synchronized and can then be engaged in a load-free manner. The sixth gear G6 is thus engaged and the shifting operation for the shifting elements S1-S6 is completed. The load transfer from the electric engine 2 to the combustion engine 21 can then take place according to the operating strategy.

To summarize, to reach the sixth gear G6 from the fifth gear G5, both the fourth shifting element S4 and the first shifting element S1 must be shifted. The fourth shifting element S4 is firstly changed and only after that the first shifting element S1. The electric engine 2 thus firstly has its speed reduced and can synchronize with a high torque. Less energy is required for the speed change of the inertia mass of the rotor 19. If the first shifting element S1 were changed first, the speed of the electric engine 2 would temporarily increase significantly and there would be a risk of overspeed, a low torque of the electric engine 2 with a high speed.

The method is independent of the pre-transmission of the planetary stage PG2 for the electric engine 2. It also works without a planetary stage PG2, in which case the electric engine 2 or the rotor 19 would be directly connected to the first gear input shaft 4.

As already described, in the direct gear, in the tenth gear G10 (see FIG. 3) in the ISG mode, the speed of the countershaft VW or of the countershafts can be reduced. Additionally for the ISG mode, the sixth shifting element S6, in the second shifting position J, is engaged. There is combustion engine driving, with the third shifting element S3 being in its second shifting position F. The fourth shifting element S4 is, due to its previous history, in its second shifting position H. This means that in the numeral example in FIG. 2, the speed of the countershaft VW is higher by a factor of 2.197 than that of the combustion engine 21. This corresponds to the spur gear transmission i of the fifth gear plane R5. The sun gear SR1 and the carrier ST1 of the range group PG1 have identical speeds because the range group PG1 is locked by the fifth shifting element in its second shifting position S. The decrease in the speed of the countershaft VW permits a better overall efficiency of the gear unit 1 in the direct gear G10. Less speed means less drag losses or power loss at the bearings and seals. For this purpose, load-free shifting elements can be engaged. In the present gear set, it is advantageous to bring the first shifting element S1 into its first shifting position A. The speed of the countershaft VW is then only (1/1.3=6.769) 0.769 that of the combustion engine 21. The speed of the countershaft VW can also be reduced to zero. Drag losses at the bearing would then be avoided. The synchronization of the countershaft VW to the target speed takes place via a speed control at the electric engine 2. For this purpose, firstly the shifting element of the highest gear of the first partial gear is engaged, if it is not engaged as a result of its previous history. In the example depicted here that is the first shifting element, in the second shifting position B, by means of which the fourth gear G4 is formed via the second gear plane R2. Thus the electric engine 2 itself also does not reach a high speed level and can thus synchronize more quickly. No conventional synchronization is loaded. In the shifting matrix in FIG. 3, in the case of the tenth gear with a preselected sixth gear G10(6), the speed of the countershaft VW is reduced and, in the tenth gear with a preselected idling G10(0), the speed of the countershaft VW and the speed of the electric engine 2 are reduced to zero. Here too, the speed change of the countershaft VW takes place with the aid of the electric engine 2.

FIG. 4 shows a corresponding shifting matrix of the gear unit 1 for the ten gears G1-G10 from the perspective of the combustion engine 21 in the EDSU mode. The sixth shifting element S6 remains in its first shifting position I. Otherwise the shifting matrix in the EDSU mode is identical to the shifting matrix in the ISG mode of FIG. 3. However there are different speed ratios at the electric engine 2 and at the planetary stage PG2.

The tractive force interruption-free shift of the range group PG1, in the change from the fifth gear G5 to the sixth gear G6, can also be realized in the EDSU mode. The sixth shifting element S6 is always in its first shifting position I. In fifth gear G5 in the case of combustion engine driving or hybrid driving in the EDSU mode, it is shifted via a direct gear in the slow gear range PG1. The third shifting element S3 is in its second shifting position F and the fifth shifting element is in its first shifting position L. This can also be seen in FIG. 4 in the line G5(4). The electric engine 2 still functions in the fourth gear G4 due to the previous history, with the first shifting element S1, being in its second shifting position B, and the fourth shifting element S4, in its first shifting position G. In order to now shift in a tractive force interruption-free manner to the sixth gear G6, the following method steps are realized If there is a load on the electric engine 2, a load reduction takes place here. The combustion engine 21 takes on the load.

The fourth shifting element S4 can then be disengaged from the shifting position G.

The second shifting position H of the fourth shifting element S4 is actively synchronized via the speed control of the electric engine 2, For this purpose, the speed of the carrier ST2 of the planetary stage PG2 must be reduced, which takes place by means of a reduction of the speed of the electric engine 2. The speed reduction at the carrier ST2 of the planetary stage PG2 takes place by the factor of the transmission of the range group PG1, which corresponds to the factor 3.713 in the numerical example of FIG. 4.

The fourth shifting element S4 can then be shifted in a load-free manner to the second shifting position H. This corresponds to the line of gear 5 (9) in the shifting matrix FIG. 4. In this state, the ninth gear G9 is transitionally preselected because the first shifting element S1 is still in its second shifting position B. It can now be disengaged in a load-free manner. The first shifting position A of the first shifting element S1 is now actively synchronized via speed control of the electric engine 2. For this purpose, the speed of the carrier ST2 of the planetary stage PG2 must be increased with the aid of the electric engine 2 to the target speed level of the sixth gear G6. The speed increase takes place by the ratio of the gear transmission of the two gears which are assigned to the first gear input shaft. Here these are first and fourth gears G1, G4, which means a speed increase by the factor 1.3/0.592=2.2 (see FIG. 2, first and second gear planes R1, R2).

The first shifting element S1 can thus be brought load-free to the first shifting position A, with the connection gear, the sixth gear G6, being simultaneously preselected.

The torques of the combustion engine 21 and of the electric engine 2 are then set such that they are proportional to the stationary transmission of the planetary stage PG2, so that the third shifting element S3 to be uncoupled becomes load-free. The force flow then runs exclusively via the carrier ST2 of the planetary stage PG2 via the target gear, the sixth gear G6, via the first shifting element S1, in the first shifting position A, and the fourth shifting element, in the second shifting position H. At the same time, the torques of the combustion engine 21 and the electric engine 2 within the limits of both work machines are set such that the tractive force comes as close as possible to the nominal value desired by the driver or according to a driving strategy function.

Once the third shifting element S3 is load free, the second shifting position F of the third shifting element S3 is disengaged.

A change of the fifth shifting element S5 from the first shifting position L to its second shifting position S can now optionally take place while the shifting position F of the third shifting element S3 is disengaged. This provides the advantage that only the main shaft 10, and thus a low inertia mass, acts on the sun gear SR1 of the first planetary gear PG1. The synchronization takes place via the shifting element S5 itself, which has a synchronized design. The second shifting position S of the fifth shifting element S5 can then be engaged. The change from the first shifting position L to the second shifting position S of the fifth shifting element S5 is at this point, as already mentioned, advantageous but not absolutely necessary. The change could also take place, at a later point in time, outside of the shifting from the fifth gear G5 to the sixth gear G6. The fifth shifting element S5 would then remain, for the time being, in the first shifting position L.

Immediately after the shifting position F of the third shifting element S3 is disengaged, in other words, possibly at the same time as the just mentioned step, the torque of the combustion engine 21 and of the electric engine 2 are controlled or regulated such that the speed of the combustion engine 21 drops to the target speed. The first shifting position C of the second shifting element S2 is thus synchronized and can then be engaged in a load-free manner. The sixth gear G6 is thus engaged and the shifting operation for the shifting elements S1-S6 is completed. The load transfer from the electric engine 2 to the combustion engine 21 can then take place according to the operating strategy.

In summary, in order to reach the sixth gear G6 from the fifth gear G5 in the EDSU mode, both the fourth shifting element S4 and the first shifting element S1 must be changed. The fourth shifting element S4 is firstly changed and only after that the first shifting element S1. Thus the electric engine 2 firstly has its speed reduced and it can synchronize with a high torque. Less energy is required for the speed change of the inertia mass of the rotor 19 if firstly the first shifting element S1 were to be shifted, the speed of the electric engine 2 would transitionally increase significantly and there would be a risk of overspeed, a low torque of the electric engine 2 at a high speed.

For the first and the fourth shifting element S1 and S4 a respective load-free speed synchronization takes place with the aid of the electric engine 2. At the ring gear HR2 of the planetary stage PG2 a dynamic torque is supported due to inertia mass, which dynamic torque could have a negative impact on driving comfort because the ring gear HR2 of the planetary stage PG2 is connected, via the sixth shifting element S6 in the first shifting position I, to the second gear input shaft 5. Thus, even before the speed synchronization, a shifting could occur from the EDSU mode to the ISG mode and corresponding synchronization thereto could take place. After the respective speed synchronization, then a change back to the EDSU mode takes place.

Other gear associations are also conceivable in the main gear HG. For example, the second gear plane R2 and the fourth gear plane R4 can be interchanged. The gear planes for the third gear G3 and the fourth gear G4 would thus be interchanged.

In addition, a separating clutch or starting clutch for the combustion engine 21 can be added.

Furthermore, one or more mechanical reverse gears can be added. This can be realized either as an additional spur gear plane with an additional shifting element or as a planet reversing gear set with two additional shifting elements, one for forward and one for reverse. Furthermore, a so-called GPR range group can be used, in which the reverse gear is integrated into the range group.

Figure 5:
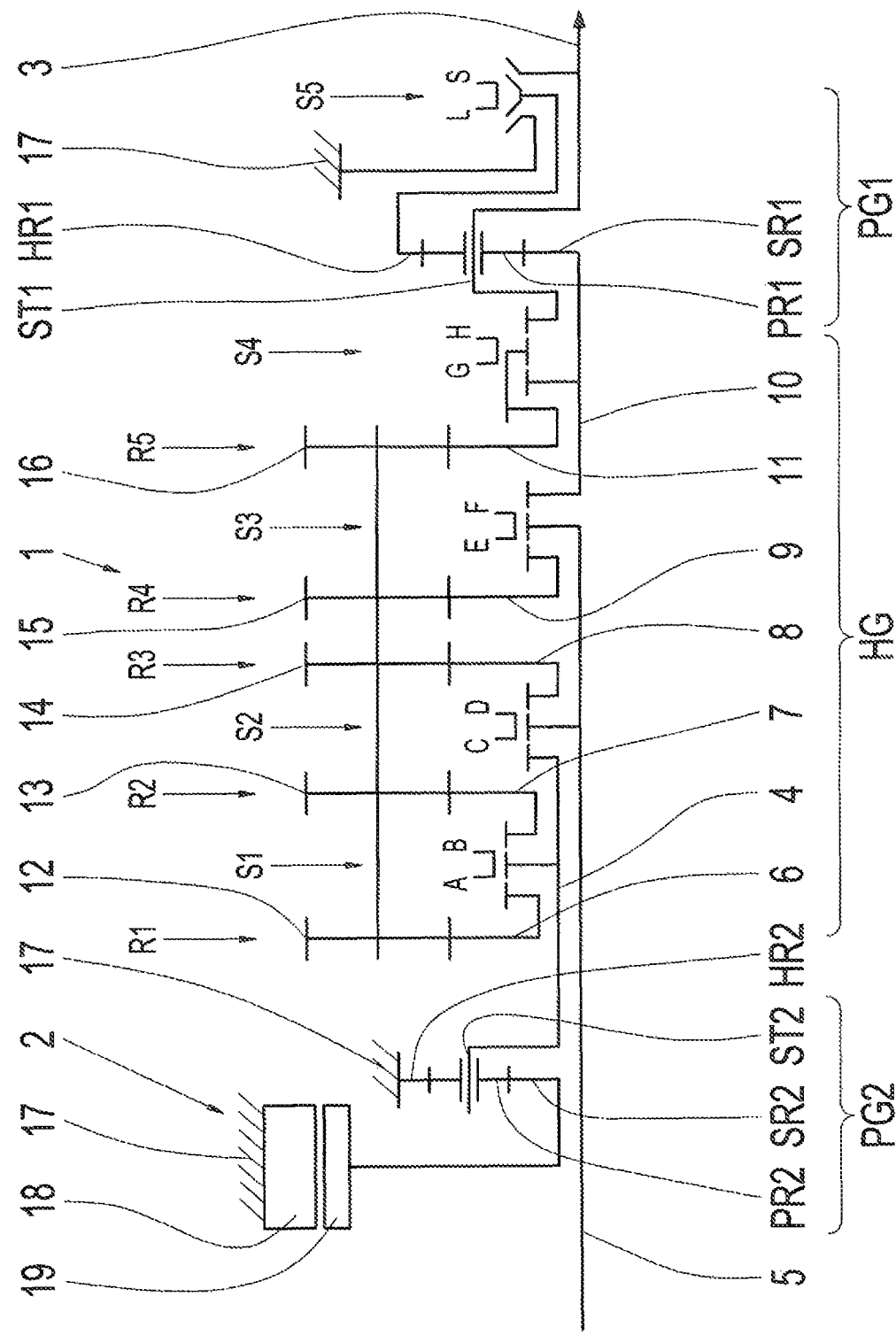
FIG. 5: an embodiment variant 2 of a 10-gear gear unit for the method according to the invention.

FIG. 5 shows a second embodiment variant of a 10-gear gear unit. The gear unit 1 differs only in the design of the second planetary gear PG2. The second planetary gear PG2 is likewise arranged as a planetary stage between an electric engine 2 and the first gear input shaft 4. The electric engine 2 has a stator 18, which is connected, in a torque-resistant manner, to a housing-fixed component 17 or a gear housing of the gear unit 1 or to another torque-resistant constructive element of the gear unit 1, so that the stator 18 cannot take on any speed. A rotatably mounted rotor 19 of the electric engine 2 is connected, in a torque-resistant manner, to a planetary gear set shaft of the planetary stage formed as a sun gear SR2 of the second planetary gear PG2. The carrier ST2 of the second planetary gear PG2 is connected, in a torque-resistant manner, to the first gear input shaft 4. The ring gear HR2 of the second planetary gear PG2 is connected, in a torque-resistant manner, to a housing part 17. A fixed pre-transmission for the electric engine 2 has the advantage that the electric engine 2 can be designed, in a cost-efficient manner, with less torque but with a higher speed. Thanks to the arrangement of the electric engine 2 with the planetary stage on the first gear input shaft 4 the electric engine 2 is still assigned to the first partial gear. The further construction of the gear unit 1 corresponds to the first embodiment variant of FIG. 1.

The pre-transmission by means of the planetary stage PG2 could also be entirely dispensed with. The electric engine 2 is then designed with less speed and more torque. Other gear associations are also conceivable in the main gear HG. For example, the second gear plane R2 and the fourth gear plane R4 can be interchanged. The gear planes for the third gear G3 and the fourth gear G4 would thus be interchanged.

In addition, a separating clutch or starting clutch can be added for the combustion engine 21, The second and the third shifting elements S2, S3 can then be designed as synchronized shifting elements and the synchronization of the gears of the second partial gear, the gears which are assigned to the second gear input shaft 5 takes place with a disengaged clutch.

Furthermore, one or more mechanical reverse gears can be added here too. This can be realized either as an additional spur gear plane with an additional shifting element or as a planet reversing gear set with two additional shifting elements, one for forward and one for reverse. Furthermore, a so-called GPR range group can be used, in which the reverse gear is integrated into the range group.

The numerical values for the individual transmissions i of the respective gear planes PG1, PG2, R1-R5, listed in FIG. 2 by way of an example, can also be used for these embodiment variants. Other numerical values can likewise also be used here however.

FIG. 6 shows a corresponding shifting matrix of the gear unit 1 of FIG. 5 for the ten gears G1-G10 from the perspective of the combustion engine 21. This shifting matrix essentially corresponds to the shifting matrix of FIG. 3 in the ISG mode, with the sixth shifting element S6 being dispensed with because the ring gear HR2 of the planetary stage PG2 is permanently connected in a torque-resistant manner to a housing part. The tractive force interruption-free shifting of the range group PG1 and the method for reducing the countershaft speed in the direct gear, the tenth gear G10, are likewise realized as in the first variant in FIG. 1.

Figure 7:
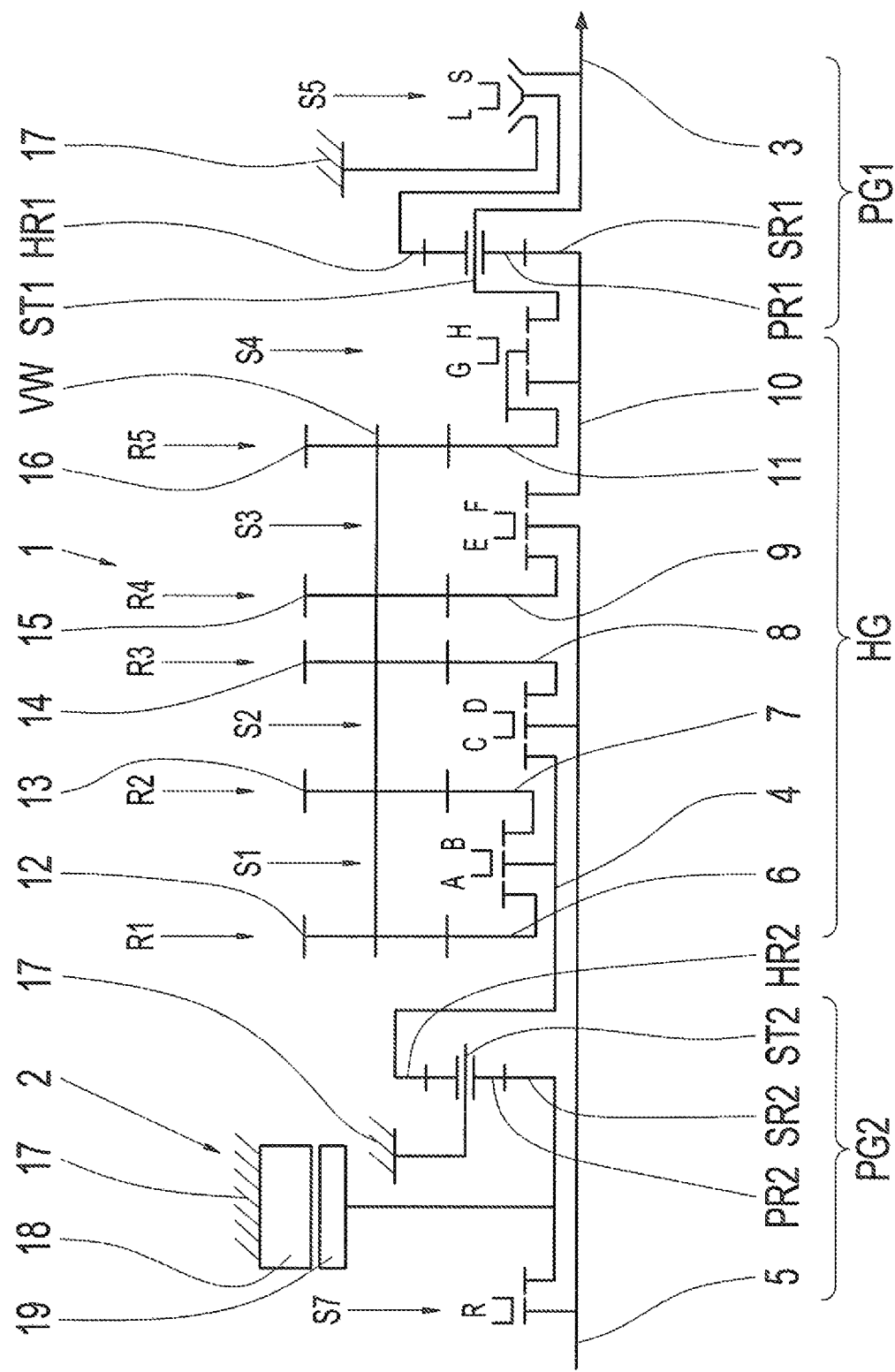
FIG. 7: an embodiment variant 3 of a 10-gear gear unit for the method according to the invention.

FIG. 7 shows a third embodiment variant of a 10-gear gear unit. The gear unit 1 differs from the two previously mentioned embodiment variants only in the design of the second planetary gear PG2. The second planetary gear PG2 is likewise arranged as a planetary stage between an electric engine 2 and the first gear input shaft 4. The electric engine 2 has a stator 18, which is connected, in a torque-resistant manner, to a housing-fixed component 17 or a gear housing of the gear unit 1 or to another torque-resistant constructive element of the gear unit 1, so that the stator 18 cannot take on any speed. A rotatably mounted rotor 19 of the electric engine 2 is connected, in a torque-resistant manner, to a planetary gear set shaft of the planetary stage formed as a sun gear SR2 of the second planetary gear PG2. The ring gear HR2 of the second planetary gear PG2 is connected, in a torque-resistant manner, to the first gear input shaft 4. The carrier ST2 of the second planetary gear PG2 is connected, in a torque-resistant manner, to a housing part 17. In addition, a seventh shifting element S7 is assigned to the second planetary gear PG2, which seventh shifting element can connect the electric engine 2 and the planetary gear set shaft of the planetary stage, formed as a sun gear SR2 of the second planetary gear PG2, to the second gear input shaft 5. This seventh shifting element S7 acts only on one side and in the engaged shifting position R, it can connect the second gear input shaft 5 and the sun gear SR2 of the second planetary gear to one another, or it can be disengaged and create no connection between two components. A fixed pre-transmission for the electric engine 2 has the advantage that the electric engine 2 can be designed in a cost-efficient manner with less torque but with a higher speed. In the present case, the electric engine 2 rotates backwards in the forwards gears, which is easily possible in the case of an electric engine 2. By means of the planetary stage PG2 with the aid of the seventh shifting element S7 in its shifting position R, mechanical reverse gears are provided for the combustion engine 21. The gears which are assigned to the first partial gear, the gears of the first gear input shaft 4 with the first and second gear plane R1 and R2, are then used as reverse gears with additional reduction by means of the planetary stage PG2. Thanks to the arrangement of the electric engine 2 with the planetary stage on the first gear input shaft 4, the electric engine 2 is still assigned to the first partial gear. The remaining construction of the gear unit 1 corresponds to the first embodiment variant of FIG. 1.

The numerical values for the individual transmissions i of the respective gear planes PG1, PG2, R1-R5, listed by way of an example in FIG. 2, can also be used for this embodiment variant. Equally, other numerical values may also be used here however.

FIG. 8 shows a corresponding shifting matrix of the gear unit 1 of FIG. 7 for the ten gears G1-G10 and four reverse gears GR1-GR4 from the perspective of the combustion engine 21. This shifting matrix essentially corresponds to the shifting matrix of FIG. 3, with the sixth shifting element S6 being dispensed with and a seventh shifting element S7 with a shifting position R being included. The tractive force interruption-free shifting of the range group PG1 and the method for synchronization of the countershaft speed in the direct gear, the tenth gear G10, are likewise realized as in the first variant in FIG. 1.

The power flow in the first reverse gear RG1 is, as depicted in FIG. 8, conveyed to the output shaft 3 via the second gear input shaft 5, the seventh shifting element S7 in its shifting position R, the second planetary gear PG2, the first gear input shaft 4, the first shifting element S1, in its first shifting position A, the first gear plane R1, the countershaft VW, the output constant R5, the fourth shifting element S4 in its first shifting position G, the main shaft 10 and the range group PG1 shifted in the slow range. The power flow in the second reverse gear RG2 is conveyed to the output shaft 3, via the second gear input shaft 5, the seventh shifting element S7, in its shifting position R, the second planetary gear PG2, the first gear input shaft 4, the first shifting element S1 in its second shifting position B, the second gear plane R2, the countershaft VW, the output constant R5, the fourth shifting element S4 in its first shifting position G, the main shaft 10, and the range group PG1 shifted in the slow range. The power flow in the third reverse gear RG3 is conveyed to the output shaft 3 via the second gear input shaft 5, the seventh shifting element S7 in its shifting position R, the second planetary gear PG2, the first gear input shaft 4, the first shifting element S1 in its first shifting position A, the second gear plane R2, the countershaft VW, the output constant R5, the fourth shifting element S4 in its second shifting position H and the range group PG1 shifted in the fast range. The power flow in the fourth reverse gear RG4 is conveyed to the output shaft 3, via the second gear input shaft 5, the seventh shifting element S7 in its shifting position R, the second planetary gear PG2, the first gear input shaft 4, the first shifting element S1 in its second shifting position B, the first gear plane R1, the countershaft VW, the output constant R5, the fourth shifting element S4 in its second shifting position H, and the range group PG1 shifted in the fast range.

To reduce the speed of the electric engine 2 in particular in the direct gear the following method is carried out:

Starting from a gear of the second partial gear, which is assigned to the second gear input shaft 5, in combustion engine driving.

This can be for example be the direct gear, the tenth gear G10, in which the third shifting element S3 is in its second shifting position F.

The speed of the electric engine 2 is reduced, in that the first shifting element S1 is disengaged and the seventh shifting element S7 is brought into its shifting position R.

The seventh shifting element S7, or the thus shifted gear, is synchronized through the speed control of the electric engine 2. The electric engine 2 then rotates at the same speed as the combustion engine 21 and the pre-transmission of the planetary stage PG2 is not effective. This has the advantage that low zero-load losses at the electric engine 2 are obtained. The electric engine 2 is directly connected to the combustion engine 21, so that in the case of a load point increase at the combustion engine 21 the additional torque of the combustion engine 21 is not conveyed to the electric engine 2 via a tooth system. This provides good mechanical efficiency. In the shifting matrix in FIG. 8, this is shown in line G10 (R). In addition, in this example the countershaft speed is reduced by means of engaging the second shifting element S2 in the second shifting position D (third gear plane R3 with spur gear transmission −1). In the numerical example, the combustion engine 21, the electric engine 2 and the countershaft VW all then rotate at the same speed. In the case of long-distance trucks, the reduction in the direct gear is particularly useful, because the direct gear has a high driving percentage.

The gear unit 1 can be a component of a drive train 20 of a hybrid vehicle. This is depicted in FIG. 9. The drive train 20 has, in addition to the gear unit 1, a combustion engine 21 as a second drive, and an axle drive 23 connected to wheels 22 of the hybrid vehicle, with the second gear input shaft 5 of the main gear HG being permanently connected or connectable to the combustion engine 21 and the output shaft 3 of the gear unit 1 being connected, in a drive-effective manner, to the axle drive 23. A separating clutch for the combustion engine 21 can be installed between the combustion engine 21 and the gear unit 1, but is not necessary for purely electric driving because the second gear input shaft 5 can be uncoupled as described by means of disengaging shifting elements.

REFERENCE NUMERALS 1 gear unit
2 electric engine
3 output shaft
4 first gear input shaft
5 second gear input shaft
6 first loose wheel of the main gear
7 second loose wheel of the main gear
8 third loose wheel of the main gear
9 fourth base wheel of the main gear
10 main shaft
11 fifth loose wheel of the main gear
12 first fixed wheel of the countershaft
13 second fixed wheel of the countershaft
14 third fixed wheel of the countershaft
15 fourth fixed wheel of the countershaft
16 fifth fixed wheel of the countershaft
17 housing-fixed component
18 stator of the electric engine
19 rotor of the electric engine
20 drive train
21 combustion engine
22 wheels
23 axle gear
HG main gear
PG1 first planetary gear, range group
PG2 second planetary gear, planetary stage
EM electric engine
HR1, HR2 ring gear
ST1, ST2 carrier SR1, SR2 sun gear
PR1, PR2 planetary gear
S1 first shifting element
S2 second shifting element
S3 third shifting element
S4 fourth shifting element
S5 fifth shifting element
S6 sixth shifting element
S7 seventh shifting element
A first shifting position of the first shifting element S1
B second shifting position of the first shifting element S1
C first shifting position of the second shifting element S2, partial gear coupling
D second shifting position of the second shifting element S2
E first shifting position of the third shifting element S3
F second shifting position of the third shifting element S3, direct gear
G first shifting position of the fourth shifting element S4
H second shifting position of the fourth shifting element S4, tractive force support of the range group
I first shifting position of the fifth shifting element S5, EDSU mode
J second shifting position of the fifth shifting element S5, ISG mode
L first shifting position of the sixth shifting element S6, slow range
S second shifting position of the sixth shifting element S6, fast range
R1 first gear plane
R2 second gear plane
R3 third gear plane
R4 fourth gear plane
R5 fifth gear plane, output constant
G1 first gear
G2 second gear
G3 third gear
G4 fourth gear
G5 fifth gear
G6 sixth gear
G7 seventh gear
G8 eighth gear
G9 ninth gear
G10 tenth gear
GR1 first reverse gear
GR2 second reverse gear
GR3 third reverse gear
GR4 fourth reverse gear
i transmission
phi gear step

The invention claimed is:

1. A method for tractive force interruption-free shifting of a range group of a gear unit, which is driven by a hybrid drive comprising a combustion engine and an electric engine, where the gear unit comprises a main gear having two parallel connected partial gears and at least one countershaft (VW), as well as an output shaft, and first and second planetary gears each having an elements carrier, a sun gear and a ring gear, each partial gear having a gear input shaft, with a first gear input shaft being designed as a hollow shaft and a second gear input shaft being designed as a solid shaft, the first planetary gear being connected, as the range group, to the main gear, the main gear comprising at least first, second, third, fourth and fifth gear planes and at least first, second, third and fourth shifting elements, wherein the electric engine is connected via the countershaft and the fourth shifting element to the carrier of the range group, which is connected to the output shaft, so that the electric engine supports tractive force while the first planetary gear, for purpose of a range change is shifted, the fourth shifting element, in a second shifting position, connects the fifth gear plane and the carrier of the first planetary gear and thus the first planetary gear can be shifted under load.

2. The method for tractive force interruption-free shifting of the range group of the gear unit according to claim 1, further comprising achieving the range change during in a change from fifth gear to sixth gear.

3. The method for tractive force interruption-free shifting of the range group of the gear unit according to claim 1, further comprising firstly shifting the fourth shifting element and, thereafter, shifting the first shifting element from a second shifting position, for connection of the second gear plane to the first gear input shaft, to a first shifting position, for connection of the first gear plane to the first gear input shaft.

4. The method for tractive force interruption-free shifting of the range group of the gear unit according to claim 1, further comprising:
reducing a load of the electric engine, if the load is present,
disengaging the fourth shifting element in a load-free state,
actively synchronizing a second shifting position, of the fourth shifting element, by a speed reduction of the electric engine,
engaging the second shifting position of the fourth shifting element in a load-free state,
diengaging the first shifting element in a load-free state,
active synchronizing a first shifting position, of the first shifting element, by a speed control of the electric engine,
engaging the first shifting element in the first shifting position in a load-free state,
transferring load from the combustion engine to the electric engine and thus support of tractive force by the electric engine or torque setting of the combustion engine and the electric engine, so that the third shifting element becomes load free,
disengaging the third shifting element in a load-free state,
synchronizing the second shifting element in a first shifting position, and
engaging the second shifting element in the first shifting position in a load-free state.

5. The method for tractive force interruption-free shifting of the range group of the gear unit according to claim 4, wherein, during the active synchronization of the first shifting position of the first shifting element by means of speed control of the electric engine, either increasing a speed of the carrier of the second planetary stage by means of increasing a speed of the electric engine to a target speed level or increasing the speed of the electric engine itself to the target speed level.

6. The method for tractive force interruption-free shifting of the range group of the gear unit according to claim 4, wherein, during synchronization of the second shifting element in its first shifting position, bring the combustion engine to a target speed or controlling torque of the combustion engine and the electric engine such that a speed of the combustion engine falls to the target speed.

7. The method for tractive force interruption-free shifting of the range group of the gear unit according to claim 1, wherein realizing the shifting of the first planetary gear itself by a fifth shifting element, with the ring gear of the first planetary gear either being coupled to the output shaft or being locked in a housing-fixed manner.

8. The method for tractive force interruption-free shifting of the range group of the gear unit according to claim 1, wherein shifting the fifth shifting element after disengagement of the third shifting element.

9. The method for tractive force interruption-free shifting of the range group of the gear unit according to claim 1, wherein simultaneously shifting the fifth shifting element with the synchronization of the second shifting element in its first shifting position.

10. A method for tractive force interruption-free shifting of a range group of a gear unit, which is driven by a hybrid drive comprising a combustion engine and an electric engine, where the gear unit comprises a main gear having two parallel connected partial gears and at least one countershaft, as well as an output shaft, and first and second planetary gears each having an elements carrier, a sun gear and a ring gear, each partial gear having a gear input shaft, with a first gear input shaft being designed as a hollow shaft and a second gear input shaft being designed as a solid shaft, the first planetary gear being connected, as the range group, to the main gear, the main gear comprising at least first, second, third, fourth and fifth gear planes and at least first, second, third and fourth shifting elements, the method comprising:

connecting the electric engine, via the countershaft and the fourth shifting element, to the carrier of the first planetary gear, which is connected to the output shaft, so that the electric engine supports tractive force while shifting the first planetary gear, for purpose of the range change, and connecting the fifth gear plane and the carrier of the first planetary gear, via a second shifting position of the fourth shifting element, so that the first planetary gear can be shifted under load.

* * * * *